April 20, 1937.  J. W. LOGAN, JR  2,077,946
EMPTY AND LOAD BRAKE
Filed June 8, 1935  3 Sheets—Sheet 1
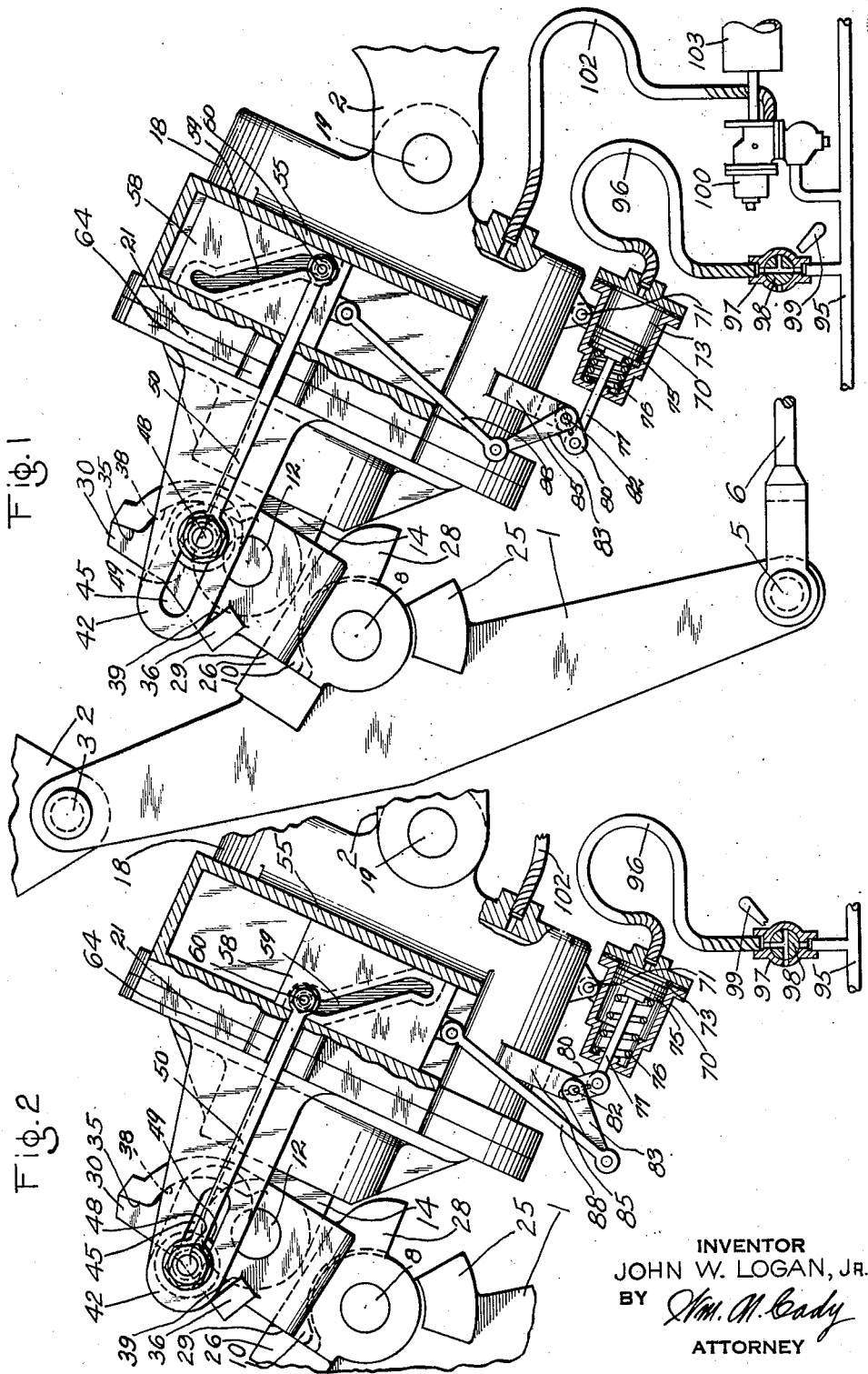
INVENTOR
JOHN W. LOGAN, JR.
BY Wm. M. Cady
ATTORNEY

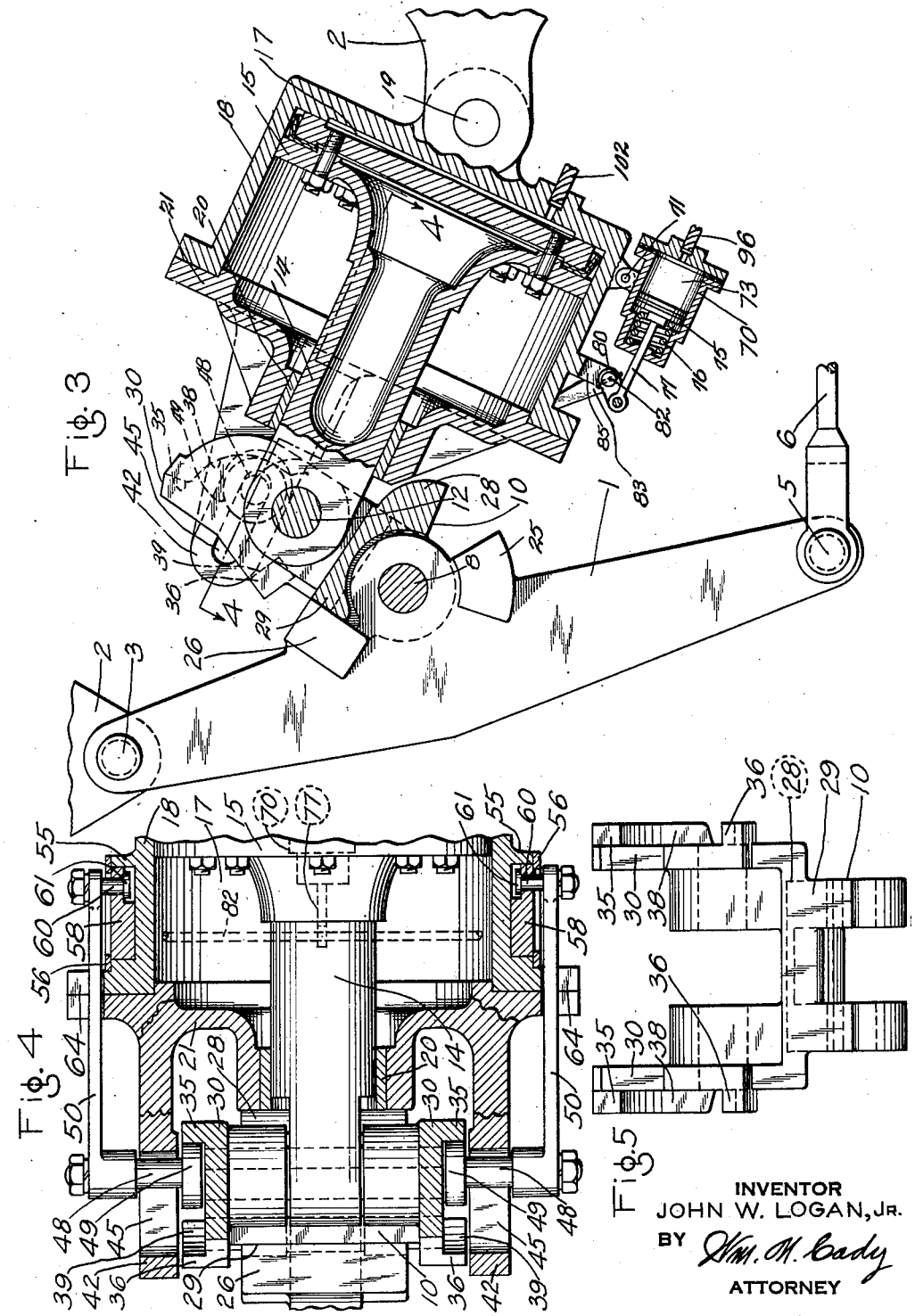

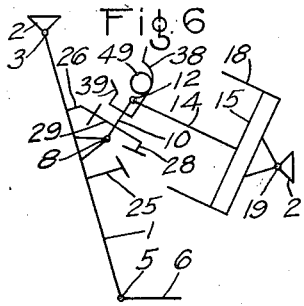
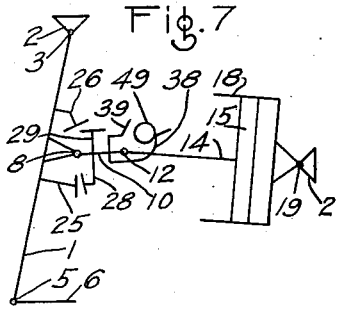
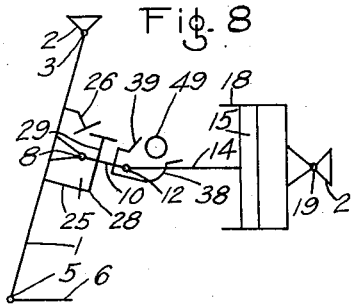
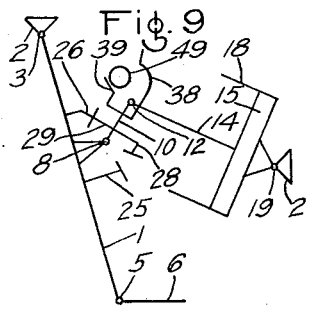
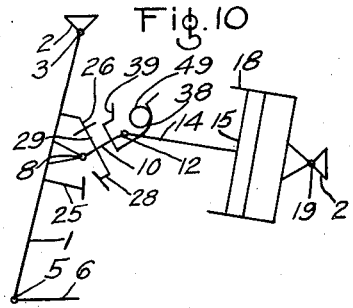
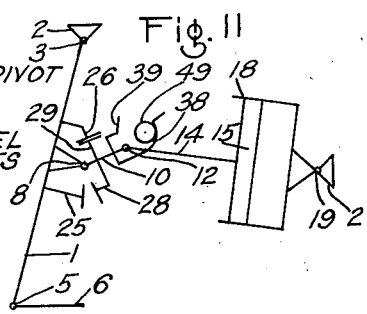
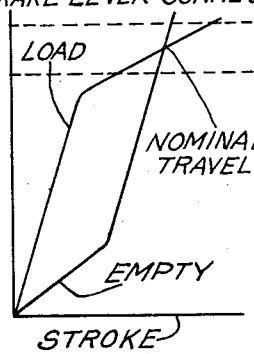
INVENTOR
JOHN W. LOGAN, JR.
BY
ATTORNEY Patented Apr. 20, 1937

2,077,946

UNITED STATES PATENT OFFICE 2,077,946

EMPTY AND LOAD BRAKE

John W. Logan, Jr., Forest Hills, Pa., assignor to The Westinghouse Air Brake Company, Wilmerding, Pa., a corporation of Pennsylvania Application June 8, 1935, Serial No. 25,564

19 Claims. (Cl. 188—195)

This invention relates to fluid pressure brakes and more particularly to an empty and load brake apparatus.

The principal object of my invention is to provide an improved and simplified empty and load brake apparatus in which a single brake cylinder is associated with an auxiliary reservoir and a triple valve device of the type in common use, and in which the braking force may be adjusted according as the car is empty or loaded to provide a greater braking force for a loaded car than for an empty car and still maintain substantially the same piston travel whether the apparatus is conditioned for empty or load braking.

Other objects of the invention and features of novelty will be apparent from the following description taken in connection with the accompanying drawings in which Fig. 1 is a fragmentary elevational view of a braking apparatus embodying my invention showing the apparatus conditioned for load braking;

Fig. 2 is an elevational view of part of the apparatus shown in Fig. 1 and showing the apparatus conditioned for empty braking;

Fig. 3 is a view similar to Fig. 1 with portions of the apparatus broken away and shown in section in order to more clearly reveal other portions;

Fig. 4 is a sectional view taken substantially along the line 4—4 of Fig. 3;

Fig. 5 is an elevational view of one of the levers employed in the apparatus shown in Fig. 1;

Figs. 6 to 8 are a series of diagrammatic views showing the relationship of the various parts of the apparatus during an application of the brakes when the apparatus is conditioned for load braking;

Figs. 9 to 11 are a series of diagrammatic views showing the relationship of the various parts of the apparatus during an application of the brakes when the apparatus is conditioned for empty braking; and Fig. 12 is a diagram showing the relationship between the movement of the piston and the change in the distance between the cylinder pivot connection and the connection of the toggle lever with the brake lever during both empty and load operation of the apparatus.

Referring to the drawings the braking apparatus provided by this invention comprises a brake lever 1 which has one end pivotally secured by means of a pin 3 to a portion of the car structure indicated at 2, and has pivotally secured adjacent the other end on a pin 5 a pull rod 6 which is connected to the brake rigging so as to effect an application of the brakes in response to movement of the brake lever.

The brake lever 1 has secured thereto intermediate its ends by means of a pin 8, a lever 10 the other end of which is pivotally secured by a pin 12 to the stem 14 of a piston 15 which is reciprocably movable in the piston chamber 17 which is formed in a cylinder 18 which is pivotally secured by means of a pin 19 to a portion of the car structure indicated at 2. The stem 14 is guided by a bushing 20 fitted in an opening in the cover plate 21 which is secured on the open face of the cylinder 18. The piston 15 and the cylinder 18 together form one lever of a toggle lever mechanism connecting the brake lever 1 with the car structure 2, the lever 10, which is pivotally secured to the brake lever and to the piston stem 14, constituting the other lever of this toggle lever mechanism.

The brake lever 1 has a pair of abutments or stops 25 and 26 formed thereon on opposite sides of the pin 8 and which are adapted to be engaged by the portions 28 and 29 of the lever 10 to limit angular movement of the lever 10 relative to the brake lever.

As is best shown in Figs. 4 and 5 of the drawings the lever 10 has formed integral therewith a pair of spaced arms 30 which lie on opposite sides of the end of the piston stem 14, being pivotally connected thereto by means of the pin 12, and the outer faces of these arms are provided with projecting portions 35 and 36 which define cam surfaces 38 and 39 respectively.

The cover plate 21 has a pair of spaced ears or projecting portions 42 formed integral therewith which extend along the outer faces of the arm 30, being disposed adjacent thereto.

Each of the ears 42 is provided with an elongated opening or slot 45 extending in a plane substantially parallel to the axis of the cylinder 17, and in each of these openings is disposed a movable member 48 comprising a substantially cylindrical portion of a diameter approximately as large as the width of the slot 45, and having an enlarged inner end portion 49 located between the projecting portions 35 and 36 on an arm 30 and adapted to engage at different times, as will hereinafter more fully appear, the cam surfaces 38 and 39.

The movable members 48 have secured thereon outwardly of the ears 42, links 50 by means of which the position of the movable members in the slots 45 may be controlled.

The cylinder 18 has formed on opposite sides thereof slide guide ways 55 in which are slidably secured by means of cover plates 56, cam plates 58, each of which has a cam slot 59, in which are positioned cam followers 60. The cam followers 60 each have a head 61 formed thereon to prevent the member from pulling out of the slot in the cam plates, the rear faces of the plates 58 being cut away adjacent the cam slots to provide spaces for the heads 61.

The links 50 are secured on the outer ends of the cam followers 60, and, as will be understood, when the cam plates 58 are reciprocated the movable members 48 will be moved in the slots 45. The end portions of the cam slots 59 extend substantially perpendicularly to the links so that forces transmitted to these links by the movable members 48 will not effect movement of the cam plates in the slide guide ways, while the links 50 extend between spaced projections 64 formed on the flanges on the cover plate 21 and on the cylinder 18, and are guided thereby so as to move only in the direction of their length when the cam plates are reciprocated.

Means is provided to move the cam plates between their upper and lower positions and this means comprises a casing 70 pivotally secured to the cylinder 18 by means of a pin 71, and having formed therein a piston chamber 73 in which is mounted the piston 75 which is urged to the right, as viewed in Fig. 1 of the drawings by a spring 76. The piston 75 has a stem 77 associated therewith and this stem is connected to an arm 80 which is rigidly secured to a shaft 82 supported on brackets 85 formed integral with the cylinder 18. The shaft 82 has rigidly secured thereto adjacent the ends thereof arms 83 which are connected with the cam plates 58 by means of links 88 so that when the piston 75 is reciprocated the shaft 82 will be oscillated and the cam plates 58 will be moved in unison.

The piston chamber 73 is supplied with fluid under pressure from a suitable source, such as the brake pipe 95, through a flexible conduit 96, the supply of fluid to and the release of fluid from the piston chamber 73 being controlled by suitable valve means.

In the system shown in the drawings a manually operated valve is interposed in the pipe leading from the brake pipe to the piston chamber 73 and comprises a casing 97 having a rotary valve 98 positioned therein and controlled by a handle 99. The valve 98 has passages formed therein adapted in one position of the valve to establish communication between the brake pipe and the piston chamber, in another position to cut off this communication, and in still another position to establish communication between the piston chamber and the atmosphere.

While a manually operated valve has been illustrated for controlling the supply and release of fluid under pressure to and from the piston chamber 73 it should be understood that any of the well known means for changing over brake equipment from empty braking to load braking may be employed to operate this valve, or to actuate the cam plates.

Similarly while fluid pressure operated means has been illustrated for the purpose of shifting the cam plates 58, it should be understood that these may be shifted by any other suitable means such as by manually actuated means.

The supply and release of fluid under pressure to and from the piston chamber 17 is controlled by a triple valve device or other brake controlling valve device indicated at 100 and which communicates with the piston chamber 17 through a flexible conduit 102. The triple valve device 100 also communicates with the brake pipe 95, and with an auxiliary reservoir 103 in the usual manner.

The operation of the apparatus when conditioned for load braking will now be described. In order to condition the apparatus for load braking the handle 99 of the valve 97 is turned to a position to permit fluid under pressure to flow to the piston chamber 73, thereby forcing the piston 75 to the left, as viewed in Fig. 1 of the drawings, against the spring 76 and rotating the shaft 82 in a clockwise direction thus moving the cam plates 58 to the upper position. This movement of the cam plates 58 causes the links 50 to move the movable members 48 towards the cylinder 18. The apparatus is now in the condition illustrated in Fig. 1 of the drawings, and shown diagrammatically in Fig. 6.

As is indicated in Fig. 6 the head portions 49 of the movable members 48 are substantially in engagement with the cam surface 38 on the lever 10 at this time, while the projecting portion 29 on the lever 10 is in engagement with the stop 26 on the brake lever 1.

If the brakes are to be applied, a reduction in brake pipe pressure is effected so as to cause the triple valve device 100 to be operated in the usual manner to supply fluid under pressure to the piston chamber 17 and thereby the piston 15 is moved to the left, as viewed in the drawings, and this movement is transmitted through the stem 14 to the pin 12, and movement of the pin 12 is transmitted therethrough to the lever 10 at a point intermediate the movable members 48, which members are held in a fixed position by the links 50, and the pin 8, by means of which the lever 10 is secured to the brake lever.

As the members 48 are rigidly secured relative to the cylinder 18, and as the brake lever is movable relative to the cylinder 18, on movement of the piston 15 by the fluid under pressure in the cylinder, the lever 10 will be caused to move around the members 48, (see Figs. 6 and 7), and in moving will effect movement of the brake lever 1.

The rate of movement of the pin 8 will be more rapid than that of the piston 15 or the pin 12 as the pin 8 is located a greater distance than the pin 12 from the members about which the lever 10 pivots when it is moved by the stem 14, these members being the movable members 48, which at this time are maintained in a fixed position.

As the lever 10 moves, the cam surfaces 38 effect movement of the pin 12 downwardly, as shown in Figs. 6 to 8 of the drawings, and after a certain amount of movement of the piston 15, the pin 12 will be moved to a point substantially in alignment with the pin 8 and the pin 19 on which the cylinder 18 is pivotally secured to the car structure 2. The pin 12 will then be in a position slightly below that in which it is shown in Fig. 7 of the drawings.

On further movement of the piston 15 the cam surfaces 38, operating on the movable members 48, move the pivot pin 12 to a point on the opposite side of a plane passing between the pin 8 and the pin 19, and with the pivot point 12 in this position, the lever 10 is rotated about the pin 8 so as to cause the projection 28 to engage the stop 25. The apparatus now is in the position in which it is shown diagrammatically in Fig. 8 of the drawings, and this represents the condition of the apparatus when the brake lever is substantially at the start of the working zone.

Thereafter, on movement of the piston 15, the stem 14 acting on the lever 10 through the pin 12 will move the brake lever 1 at a rate substantially in accordance with the rate at which the piston 15 moves in the cylinder 18, that is, at a substantially less rapid rate than was effected during the initial movement of the piston 15. The rate of movement of the brake lever relative to the rate of movement of the piston during load braking is shown diagrammatically in Fig. 12 of the drawings where it will be seen that the brake lever is moved initially at a relatively rapid rate and that this rate of movement continues until the brake lever is moved to a position just short of the working zone or the position in which the brakes are applied, and that thereafter the brake lever is moved at a relatively slow rate.

The various parts of the mechanism are so proportioned that when the equipment is conditioned for load braking the brake lever 1 will be moved at a rapid rate until it reaches a point just short of the point at which the brakes are applied, and so that thereafter the rate of movement of the brake lever 1 relative to the rate of movement of the piston 15 will be reduced, with the result that the piston 15 will be able to develop very great force on the brake lever 1 in the range of movement of this member which is effective to apply the brakes. This provides the high degree of braking force which is required for load braking, yet permits the brake lever 1 to be moved sufficiently to take up the slack in the brake rigging and to move the brake shoes to the application position by means of a relatively small amount of movement of the piston 15.

The operation of the apparatus when conditioned for empty braking will now be described.

In order to condition the apparatus for empty braking the handle 99 on the valve 97 is turned to the position in which the supply of fluid under pressure to the piston chamber 73 is cut off, and in which the fluid in this chamber is released to the atmosphere. The spring 76 thereupon moves the piston 75 to the right, as viewed in Fig. 2 of the drawings, and on this movement of the piston the shaft 82 is rotated in a counterclockwise direction, thereby moving the cam plates 58 downwardly. By this movement of the cam plates the links 50 are moved away from the cylinder 18, with the result that the movable members 48 are moved to their outer position. The apparatus is now in the condition illustrated in Fig. 2 and shown diagrammatically in Fig. 9 of the drawings.

With the apparatus in this condition if fluid under pressure is admitted to the piston chamber 17, the piston 15 will move outwardly and its motion will be transmitted to the stem 14 and therethrough to the pin 12 and to the lever 10. The lever 10 is pivotally secured to the brake lever 1 by the pin 8, and on movement of the lever 10 the projection 29 on the lever 10 will be moved into engagement with the stop 26 on the brake lever if it is not already in this position. At this time the movable members 48 are out of engagement with the cam surfaces 38, being spaced therefrom a substantial distance, as is clearly shown in Fig. 9 of the drawings.

On the initial movement of the piston 15, the pin 8, by means of which the lever 10 is secured to the brake lever 1, will move at a rate substantially in accordance with the rate at which the piston 15 moves in the cylinder 18, and this rate of movement of the brake lever 1 will continue until the lever 10 has been moved an amount sufficient to move the cam surfaces 38 into engagement with the movable members 48. The condition of the apparatus at this time is shown diagrammatically in Fig. 10 of the drawings.

When the cam surfaces 38 are moved into engagement with the members 48, then on further movement of the piston 15 the cam surfaces 38 will cause the lever 10 to pivot relative to the piston stem 14, and this movement of the lever 10 will effect movement of the brake lever 1. The brake lever 1, therefore, at this time will be moved not only as a result of movement of the piston 15 but also as a result of pivoting of the lever 10, and its rate of movement, being due to this combination of forces, will be substantially increased over its rate of movement on the initial movement of the piston 15.

In empty braking, therefore, as is shown diagrammatically in Fig. 12 of the drawings, the brake lever 1 is initially moved at a relatively slow rate, and this movement is followed by the relatively rapid rate of movement of the brake lever which is in effect at the time that the brake shoes are applied to the wheels so that the brake cylinder develops a comparatively small braking force.

By properly proportioning the various parts of the apparatus it is possible to arrange the apparatus so that the amount of travel of the piston 15 which is required to move the brake lever an amount sufficient to effect an application of the brakes will be substantially the same in both empty and load braking.

However, because of the differences in the rate of travel of the brake lever 1 and of the piston 15 in different parts of their range of movement the apparatus develops relatively great braking force during load braking, as the brake lever is moved at a relatively slow rate compared to the rate of movement of the piston 15 during the range of its movement which is effective to press the shoes against the wheels, while during empty braking the apparatus develops comparatively small braking force, because at this time the brake lever 1 is moved at a relatively rapid rate as compared to the rate of movement of the piston 15 during the range of its movement which is effective to apply the shoes to the wheels.

In addition, the amount of travel of the piston 15 and the diameter of the piston may be arranged so that the volumetric displacement of the piston in effecting an application of the brakes will be substantially the same as that of the standard 10 inch brake cylinder having a normal travel of 8 inches.

In order to release the brakes after an application a release spring (not shown), is incorporated in the brake apparatus, and this spring operates to urge the brake lever 1 to move in a counterclockwise direction.

In releasing the brakes after an application of the brakes with the apparatus conditioned for load braking the movement of the brake lever by the release spring causes the piston 15 to move toward the pivot pin 19, and after a limited amount of such movement the cam surfaces 39 are moved into engagement with the movable members 48. On further movement of the piston 15 the cam surfaces 39 effect movement of the toggle levers relative to each other so that the pin 12 is shifted from the position in which it is shown in Fig. 8 to a position on the opposite side of a plane passing through the pins 8 and 19, and so that when the piston 15 and the brake lever 1 are moved to the full release position the apparatus will again be substantially in the position in which it is shown diagrammatically in Fig. 6 of the drawings.

Similarly in releasing the brakes after an application of the brakes with the apparatus conditioned for empty braking, the cam surfaces 39 will be moved into engagement with the members 48 after a limited amount of movement of the piston 15, and the apparatus will be caused to return substantially to the position in which it is shown diagrammatically in Fig. 9 of the drawings.

While one embodiment of the brake apparatus provided by this invention has been illustrated and described in detail it should be understood that the invention is not limited to these details and that numerous changes and modifications may be made without departing from the scope of the following claims.

Having now described my invention, what I claim as new and desire to secure by Letters Patent, is:

1. In an empty and load brake equipment, in combination, a brake controlling member, toggle levers connected to a support and to the brake controlling member, means for varying the distance between the pivotal connection between the toggle levers and the point of connection between one of said levers and the member to which the lever is connected, and means for varying the position of the pivotal connection between the toggle levers relative to a plane passing through the points of connection of the ends of said toggle levers.

2. In an empty and load brake equipment, in combination, a brake controlling member, toggle levers connected to a support and to the brake controlling member, means for varying the distance between the pivotal connection between the toggle levers and the point of connection between one of said levers and the member to which the lever is connected, and means responsive to changes in said distance for varying the position of the pivotal connection between the toggle levers relative to a plane passing through the points of connection of the ends of said levers.

3. In an empty and load brake equipment, in combination, a brake controlling member, toggle levers connected to a support and to the brake controlling member, means for varying the distance between the pivotal connection between the toggle levers and the point of connection between said levers and the support, and means for varying the position of the pivotal connection between the toggle levers relative to a plane passing through the points of connection of the ends of said levers.

4. In an empty and load brake equipment, in combination, a brake controlling member, toggle levers connected to a support and to the brake controlling member, means for varying the distance between the pivotal connection between the toggle levers and the point of connection between said levers and the support, and means responsive to changes in said distance for varying the position of the pivotal connection between the toggle levers relative to a plane passing through the points of connection of the ends of said levers.

5. In an empty and load brake equipment, in combination, a brake controlling member, toggle levers connected to a support and to the brake controlling member, means for varying the distance between the pivotal connection between the levers and the point of connection between one of the levers and the member to which the lever is connected, and means carried by one of said levers and cooperating with means carried by the other of said levers and operable to vary the position of the pivotal connection between the toggle levers relative to a plane passing through the points of connection of the ends of said levers.

6. In an empty and load brake equipment, in combination, a brake controlling member, toggle levers connected to a support and to the brake controlling member, means for varying the distance between the pivotal connection between the levers and the point of connection between one of the levers and the member to which the lever is connected, and means carried by one of said levers and cooperating with means carried by the other of said levers and operable responsive to changes in said distance to vary the position of the pivotal connection between the toggle levers relative to a plane passing through the points of connection of the ends of the levers.

7. In a brake system, in combination, a brake controlling member, toggle levers connected to a support and to the brake controlling member, means for varying the distance between the pivotal connection between the levers and the point of connection between one of the levers and the member to which the lever is connected, and means carried by one of said levers and cooperating with a member carried by the other of said levers and operable to vary the position of the pivotal connection between the levers relative to a plane passing through the points of connection of the ends of the levers, and means to vary the position of the member carried by said other lever.

8. In a braking system, in combination, a brake controlling member, toggle levers connected to a support and to the brake controlling member, means for varying the distance between the pivotal connection between the levers and the point of connection between one of the levers and the member to which the lever is connected, means carried by one of said levers and cooperating with a member carried by the other of said levers and operable responsive to changes in said distance to vary the position of the pivotal connection between the levers relative to a plane passing through the points of connection of the ends of said levers, and means to vary the position of the member carried by said other lever.

9. In an empty and load brake equipment, in combination, a brake lever pivotally secured to a support, toggle levers connected to the support and to the brake lever, means for varying the distance between the pivotal connection between the levers and the member to which one of the levers is connected, and means for varying the position of the pivotal connection between the levers relative to a plane extending between the points of connection of the ends of said levers.

10. In an empty and load brake equipment, in combination, a brake lever pivotally secured to a support, toggle levers connected to the support and to the brake lever, means for varying the distance between the pivotal connection between the levers and the member to which one of the levers is connected, and means carried by one of said levers and cooperating with a member carried by the other of said levers for varying the position of the pivotal connection between the levers relative to a plane extending between the points of connection of the ends of said levers.

11. In an empty and load brake equipment, in combination, a brake lever pivotally secured to a support, toggle levers connected to the support and to the brake lever, means for varying the distance between the pivotal connection between the levers and the member to which one of the levers is connected, and means responsive to changes in said distance for varying the position of the pivotal connection between the levers relative to a plane extending between the points of connection of the ends of said levers.

12. In a braking system, in combination, a brake lever pivotally secured to a support, toggle levers connected to the support and to the brake lever, means for varying the distance between the pivotal connection between the levers and the member to which one of the levers is connected, means carried by one of said levers and cooperating with a member carried by the other of said levers for varying the position of the pivotal connection between the levers relative to a plane extending between the points of connection of the ends of said levers, and means to adjustably vary the position of the member carried by said other lever.

13. In an empty and load brake equipment, in combination, a brake lever pivotally secured to a support, a pair of levers pivotally connected together, one of said levers being pivotally connected to the brake lever, the other of said levers being pivotally connected to the support, means for varying the length of the lever which is connected to the support, and means responsive to changes in the distance between the support and the pivotal connection between the levers for controlling the position of the pivotal connection between the levers relative to a plane extending between the pivotal connections at the ends of the levers.

14. In an empty and load brake equipment, in combination, a brake lever pivotally secured to a support, a pair of levers pivotally connected together, one of said levers being pivotally connected to the brake lever, the other of the levers being pivotally connected to the support, means for varying the length of the lever which is connected to the support, and means carried by the lever pivotally connected to the brake lever and cooperating with a member carried by the other of said levers for controlling the position of the pivotal connection between the levers relative to a plane extending between the pivotal connections at the ends of the levers.

15. In an empty and load brake equipment, in combination, a brake lever pivotally secured to a support, a pair of levers pivotally connected together, one of said levers being pivotally connected to the brake lever, the other of said levers being pivotally connected to the support, means for varying the length of the lever which is connected to the support, means responsive to changes in the distance between the support and the pivotal connection between the levers for controlling the position of the pivotal connection between the levers relative to a plane extending between the pivotal connection at the ends of the levers, and means to limit rotation of the lever connected to the brake lever relative to the brake lever.

16. In an empty and load brake equipment, in combination, a brake lever pivotally secured to a support, a pair of levers pivotally connected together, one of said levers being pivotally connected to the brake lever, the other of said levers being pivotally connected to the support, means to vary the length of the last named lever, a member carried by the last named lever and maintained thereby at a substantially fixed distance from the point of connection of the lever with the support, and means associated with the other of said levers and cooperating with said member and operable to control the position of the pivotal connection between the levers relative to a plane passing between the points of connection between the levers and the members connected thereto.

17. A braking system as described in claim 16 and characterized by means to adjustably vary the distance between the support and the member carried by the lever connected to the support.

18. A braking system as described in claim 16 and characterized by means to limit rotation of the lever connected to the brake lever relative to the brake lever.

19. In a braking system, in combination, a brake lever, a brake cylinder, a piston in said cylinder, a lever mechanism operatively connecting said piston to said lever and including means operative upon movement of said piston for first moving said lever at a fast rate and then at a slower rate relative to said piston, and mechanism for conditioning said lever mechanism and means so that movement of said piston effects first a movement of said lever at a slow rate and then at a more rapid rate relative to said piston.

JOHN W. LOGAN, Jr.